UNITED STATES PATENT OFFICE.

CARLETON ELLIS, OF MONTCLAIR, NEW JERSEY.

HYDROGENATED EDIBLE FAT COMPOUND.

1,047,013. Specification of Letters Patent. Patented Dec. 10, 1912.

No Drawing. Continuation of application Serial No. 700,234, filed May 28, 1912. This application filed August 10, 1912. Serial No. 714,393.

*To all whom it may concern:*

Be it known that I, CARLETON ELLIS, a citizen of the United States, and a resident of Montclair, in the county of Essex and State of New Jersey, have invented certain new and useful Improvements in Hydrogenated Edible Fat Compounds, of which the following is a specification.

This invention relates to a process of making an edible oil product especially a composition suited for use as a lard substitute, and further relates to the use of hydrogenated oils and the like, especially in conjunction with other oils or fats with or without hydrogenation treatment, and relates in particular to a process of making a composition comprising such hydrogenated oils and fats as corn oil, peanut oil, soya oil or cotton seed oil and cocoanut oil, lard oil, commercial stearin, oleostearin and the like, and to an edible fatty product comprising edible hydrogenated vegetable oil with which may be incorporated edible non-vegetable fatty material blending therewith; all as more fully hereinafter described and as claimed.

Ordinary cotton seed oil has a slightly disagreeable odor and is liquid in consistency. By treatment with hydrogen in the presence of a catalyzer, such as finely divided nickel, a solid product is secured which is practically free from odor, and which may be made to blend satisfactorily with oils or fat such as cocoanut oil and the like, to produce a vegetable lard, particularly well adapted to culinary operations. Such a product, however, is not fully satisfactory in appearance for many purposes, and by the present invention special treatment is provided which affords a product of the proper appearance.

To illustrate the preferred form of the present invention, the following formula and method of treatment will be given. Ninety parts of soya bean oil or cotton seed oil are mixed with ten parts of cocoanut oil or oleostearin and the mixture subjected to the action of hydrogen at a temperature of from 150° to 160° C. in the presence of finely divided nickel, whereby a considerable proportion of the unsaturated material is converted into saturated material. The iodid number of the composition may be thereby reduced to 50 to 70 or thereabout. A solid composition is produced, which may be then subjected to the operation of aeration. The aeration treatment comprises beating the hydrogenated product with rapidly revolving paddles or blades or otherwise, until a sufficient quantity of air is incorporated in the product, in a finely vesiculated condition, to produce a material of the proper consistency and light colored appearance. Ordinarily I prefer to incorporate in this manner a volume of air equal to 5% or so of the volume of the oil which is being aerated. The proportion of cocoanut oil which thus may be incorporated is preferably about 10%, although twice this amount may be used if desired. The amount should not, however, under ordinary conditions, exceed 30%, unless care be taken to completely hydrogenate all unsaturated material in the cocoanut oil. To be sure, cocoanut oil usually has an iodin value of only 7 to 10 or so which is indicative of the small proportion of unsaturated bodies present. But, in spite of this, in order to secure a permanent product, which does not separate or grow lumpy on standing, and which remains in a perfectly neutral condition for a long period of time, even when exposed to the air, it is desirable that the iodin number of the cocoanut oil should be reduced to practically zero, if larger proportions than 30% or thereabout, are incorporated with the hydrogenated oil.

In similar manner, animal oil or fat may be incorporated in aerated mixture with hydrogenated corn or peanut oil, or similar vegetable oils, it being desirable to materially reduce the iodin number by hydrogenation in the case of these oils, in the event animal oil to the extent of 20% or 30% is to be incorporated. In any case, hydrogenation should preferably be carried to the point where a soft body of substantially the consistency of ordinary lard is produced. The advantages of such a product over ordinary lard are several. One is that owing to the high evaporation point, of the more volatile components of the hydrogenated product as above set forth, there is less smoke and fume caused when heating these oils in culinary operations. Furthermore, owing to the higher temperature which may be reached with compositions of this character, better effects are secured, especially in frying operations.

While it is possible to aerate ordinary fat, by treating in the manner described, it is difficult to produce a product which will keep for a long period when intimately incorporated with air in this manner, and treatment with hydrogen enables a stable product to be secured. By hydrogenating soya bean, cotton seed or corn oil or similar oils to materially reduce the iodin number, the more sensitive double bonds are saturated with hydrogen and thereby eliminated and oxidation tendency is reduced to a minimum.

Various catalyzers may be used in hydrogenating the oil in accordance with the present invention, but I preferably make use of either finely divided nickel or metallic cerium, or a mixture of metallic nickel and cerium.

Hydrogenated cocoanut oil alone or ordinary refined cocoanut oil mixed with hydrogenated cotton seed, corn or peanut oil and the like may be used as a fluxing agent for chocolate in the manufacture of confectionery. The melting point of the fatty flux should preferably be about 90° F. to 100° F. Hydrogenated unpressed cocoanut oil or hydrogenated cocoanut oil olein or stearin may be used in a similar manner.

This application is in part a continuation of Serial No. 700,234, filed May 28, 1912.

To recapitulate, the process involves hydrogenating an oil preferably of a vegetable nature, such as cotton seed, corn or peanut oil, to produce a hydrogenated product preferably substantially unaffected by the action of air when intimately incorporated therewith and in mixing such normally liquid oils or soft fats, stiffened or hardened by hydrogenation, with preferably a smaller quantity of an oil or normally hard animal or vegetable fat or grease, such as commercial stearin or cocoanut oil, and the like, which, preferably, has also been hydrogenated to reduce the iodin number substantially, and in preferably chilling and beating the composition to introduce a quantity of air to aerate same, said quantity of air being preferably an amount equal to 5-10% of the total volume of the oil.

The product involved herein comprises edible hydrogenated vegetable oil with which may be incorporated edible non-vegetable fatty material such as animal oil.

The terms oil and fat are for the purposes herein to be considered as practically synonymous.

What I claim is:

1. The process of making edible fatty material which comprises hydrogenating a mixture of vegetable and animal oils, whereby an edible product of increased consistency is secured, and in agitating the hydrogenated product with air, whereby a relatively small volume of air is introduced into said product.

2. The process of making edible fatty material which comprises hydrogenating a mixture of oily materials, whereby an edible product of increased consistency is secured; and in agitating the hydrogenated product with air, whereby a relatively small volume of air is introduced into said product.

3. The process of making edible fatty material which comprises hydrogenating composite oily material, whereby an edible product of increased consistency is secured; and in aerating same.

4. An edible oil composition comprising hydrogenated vegetable oil and animal fat, containing vesiculated air.

5. An edible oil product comprising a major proportion of hydrogenated vegetable oil and a minor proportion of animal fat, said composition containing vesiculated air.

6. An edible oil composition comprising about 90% of hydrogenated vegetable oil and about 10% of animal oil; said composition containing about 5% by volume of vesiculated air.

7. An edible oil composition of substantially lard like consistency comprising about 90% of hydrogenated vegetable oil and about 10% of animal fat.

8. An edible oil product comprising hydrogenated soya bean oil and hydrogenated animal oil.

9. An edible oil product comprising hydrogenated soya bean oil and animal oil stiffening material.

10. An edible oil product comprising hydrogenated soya bean oil.

11. An edible oil composition comprising hydrogenated soya bean oil containing vesiculated air.

12. An edible oil composition comprising hydrogenated soya bean oil and edible oily material blending therewith, said composition containing vesiculated air.

13. An edible oil product of lard-like consistency comprising edible hydrogenated oil comprising soya bean oil and edible oily material blending therewith.

14. An edible fat product of substantially lard-like consistency comprising edible hydrogenated vegetable oil and edible animal fat material blending therewith.

15. An edible fat product of substantially lard-like consistency comprising edible hydrogenated vegetable oil and edible hydrogenated animal fat material blending therewith.

16. An edible fatty product comprising edible hydrogenated vegetable oil and edible non-vegetable fatty material blending therewith.

17. An edible fatty product consisting of a soft fat of substantially the consistency of ordinary lard, comprising edible hydrogenated vegetable oil and edible non-vegetable fatty material blending therewith.

Signed at Montclair in the county of Essex and State of New Jersey this 6th day of August A. D. 1912.

CARLETON ELLIS.

Witnesses:
F. CARBUTT,
B. M. ELLIS.